United States Patent [19]

Hogenkamp et al.

[11] Patent Number: 5,348,436
[45] Date of Patent: Sep. 20, 1994

[54] STORE FOR INDIVIDUAL PRODUCTS

[75] Inventors: Wilhelm Hogenkamp, Hanover; Werner Hamberger, Schwieberdingen, both of Fed. Rep. of Germany

[73] Assignee: Klockner Hansel GmbH, Hanover, Fed. Rep. of Germany

[21] Appl. No.: 966,560

[22] Filed: Oct. 26, 1992

[30] Foreign Application Priority Data

Oct. 25, 1991 [DE] Fed. Rep. of Germany ....... 4135241

[51] Int. Cl.5 ............................................. B65G 1/127
[52] U.S. Cl. ................... 414/331; 198/435; 414/794.9
[58] Field of Search ............... 414/331, 794.9; 198/465.1, 435, 797

[56] References Cited

U.S. PATENT DOCUMENTS

| | | | |
|---|---|---|---|
| 3,068,987 | 12/1962 | Franklin | 198/435 |
| 3,349,928 | 10/1967 | Howard | 198/797 |
| 3,580,141 | 5/1971 | Richter | 198/435 |
| 3,677,393 | 7/1972 | Temple | 198/435 |
| 3,967,740 | 7/1976 | Molins | 414/331 |
| 4,168,776 | 9/1979 | Hoeboer | 198/797 |
| 4,890,718 | 1/1990 | Colamussi | 414/331 |

FOREIGN PATENT DOCUMENTS

| | | |
|---|---|---|
| 1756268 | 2/1971 | Fed. Rep. of Germany . |
| 2502386 | 3/1977 | Fed. Rep. of Germany . |
| 3148473 | 7/1987 | Fed. Rep. of Germany . |
| 295929 | 12/1986 | Japan .................. 414/331 |
| 64921 | 3/1989 | Japan .................. 414/331 |
| 66020 | 3/1990 | Japan .................. 198/435 |

*Primary Examiner*—Michael S. Huppert
*Assistant Examiner*—Gregory A. Morse
*Attorney, Agent, or Firm*—Hopkins & Thomas

[57] ABSTRACT

A store (1) for individual products (10) has an input station (2) and an output station (3) which can be actuated independently of each other. A storage line (8) with a variable receiving capacity is provided as well as carrier plates (11) for receiving the individual products. The carrier plates (11) can move freely within the store (1). A first input elevator (4) is provided in the area of the input station (2) and an output elevator (5) in the area of the output station (3) for building or working through full stacks (26) of carrier plates (11). The storage line (8) between the elevators (4, 5) is designed for the joint conveying of the full stack (26) congested in front of the output elevator (5) allocated to the output station (3). A transfer belt (6) and a return conveyor for full stacks (26) is located between each elevator and the storage line (8). Separate drives are provided for the elevators (4, 5), the transfer conveyor (6), the return conveyor and the storage path (8).

8 Claims, 8 Drawing Sheets

STORE FOR INDIVIDUAL PRODUCTS

FIELD OF THE INVENTION

The invention refers to a store for individual products, in particular edible sweet goods conveyed in rows, having an input station and an output station which can be actuated independently of each other, a storage line, arranged between input and output stations, with variable receiving capacity and carrier plates for receiving the individual products as well as a conveying facility for transporting the carrier plates in a roughly circular motion through the store.

BACKGROUND OF THE INVENTION

With the production and packaging of, in particular, confectionery, for example, large and small chocolate bars, the problem ensues that the production machine is operated continuously for technical production reasons, while the packaging machine or plant is shut down for bridging over intermediate periods. Such intermediate periods can be caused by breaks prescribed for the operatives in the packaging plant or through a fault, for example, changing a roller, at one or several packaging machines in the packaging plant. During all these intermediate periods, the individual products supplied by the production machine must be transferred to a store. The store is then able to be emptied again outside the intermediate periods in that the unpacked individual products are fed to the packaging plant.

A store of the above-mentioned type is known from U.S. Pat. No. 4,168,776. The essential component in this store is an endless chain which is wound around chain wheels. One part of the chain wheels is fixed locally, while other chain wheels, assembled in pairs, are arranged so that they can move vertically. An input station and an output station, separate from said input station, are built onto the store and can be operated independently of each other, i.e. the store can be filled or emptied according to requirements. Therefore, the store can either be just filled or just emptied. In addition, it is possible to empty while filling, whereby completely different speeds can also be used. The known store has a relatively large dead area, i.e. roughly 50% of its volume serves only to merely convey the individual products through the store. Before the first individual item can be picked off again from the output station, the store must be filled to approximately up to half its volume. Only the remaining half of its volume forms the storage line with variable receiving capacity. If one of the essential properties of a store is to be able to allow removal at any time or to make this possible in a relatively short time, then the ratio of storage lines with variable receiving capacity to the ratio of the dead space serving only the conveying is relatively unfavourable. This means that such a store needs to be built relatively long and high if its storage line with variable receiving capacity is to be or needs to be sufficiently large. The endless chain has carrier plates for receiving the individual products and a conveying facility for transporting the carrier plates on the chain in a roughly circular motion through the store is provided, whereby the individual drive wheels form a part of this conveying facility. Owing to the arc-like change of direction of the endless chain at the chain wheels and the step-wise or jog-wise transfer of the chain at the various positions, forces ensue at the change of direction positions which act on the individual products in a direction parallel to the main lengthwise plane of the carrier plates. In order that the individual products do not slip off the carrier plates and drop down, the carrier plates must either have an appropriate shape or other measures must be applied. It is clear that the peripheral speeds at the chain wheels are limited. The performance of such a store is thereby limited.

Stores operating on the same priniciple are known from DE-PS 31 48 473, DE-AS 17 56 268 or also from DE-AS 25 02 386. The advantages of these stores are that the input station and the output station can be operated independently of each other. Furthermore, these stores have a speciality in that the individual products can be removed again in the same sequence as they were fed in, i.e. the first individual item fed into the store is the first one to be taken out again.

For applications involving the storing of confectionery, in particular large and small chocolate bars, it is known, based on the principal arrangement of the store described above, to use gondolas which are connected via an articulated joint with the endless chain. These gondolas have a certain number of carrier plates above one another, for example, five carrier plates, whereby each carrier plate is designed and built to receive a row of confectionery items. The separation between the carrier plates within a gondola is, therefore, smaller than the distance of the lowest carrier plate of a first gondola from the uppermost carrier plate of a following gondola. The larger difference at this point is designated as a gondola jump. On the other hand however, this enables the gondolas to be able to negotiate the change of direction at the chain wheels, whereby the carrier plates always remain in the horizontally-aligned position. As the naked, unpacked items of confectionery are slid onto flat carrier plates, it is not possible to vary the shape of the carrier plates. The articulated suspension of the gondolas allows, on the one hand, the change of direction around the chain plates and on the other hand, the negative influence of the accelerating forces upon further movement of the endless chain is reduced. The disadvantage with such gondolas is that the steps in which the endless chain moves to the next stage, for example, in the area of the input station, must be large. The larger path corresponds to the gondola jump and this gondola jump thereby determines the performance of the store because this movement represents the greatest load (stress) on the items of confectionery. No item of confectionery may fall from the carrier plate at the gondola. To bridge over the separation between the carrier plates of a gondola, a similarly large timespan as with overcoming the gondola jump is ready, so that a comparatively low speed can be used here.

The other disadvantage of such stores equipped with gondolas is that owing to the way the change of direction is effected, the store needs to be built very large although its storage line with variable receiving capacity is relatively small. The sliding of the confectionery items onto the carrier plates in the area of the input station and the sliding off from the carrier plates in the area of the output station puts corresponding loads on the items of confectionery because sliding friction has to be overcome here. Incidentally, the push-on process must be so performed that the item of confectionery lies symmetrical about the hinge point of the gondola, or rather a vertical plane which passes through this hinge point. This means that with alternating confectionery formats, different paths have to be traced during the push-on process and/or carrier plates and gondolas matched to the format and shape of the respective case in question need to be used on such stores.

A further disadvantage is that all gondolas in the store must be moved during certain operating conditions. For example, this is the case when a completely empty store with respect to its dead space, i.e. with respect to its storage line with constant receiving capacity, is to be filled.

Furthermore, it is a disadvantage that with the known stores, the carrier plates fixed to the gondolas can only be cleaned with difficulty. This is practically impossible during normal, continuous production. Only if the store and the associated plant is shut down is it possible to carry out tedious cleaning.

SUMMARY OF THE INVENTION

It is the object of the invention to make available a store of the aforementioned type which exhibits the main advantages of the construction using gondolas, but at the same time does not have their disadvantages. Consequently, it depends in particular on being able to remove, as the first item, that individual product that was fed into the store first, in any case looked at in terms of stacks, and this to be achieved independently of each other and at any time, as well as to have a variable storage capacity available. The store should have a higher performance, should be quickly ready to output items, have a small constructional volume and open up the chances of standardization up to a universal store.

According to the invention, this is achieved by the store of the type described above in that the carrier plates in the store can be moved around freely, that an input elevator is provided in the area of the input station and an output elevator in the area of the output station and said elevators form or work through full stacks of carrier plates occupied with individual products, that the storage line between input and output elevators is designed for the common conveying of full stacks to a storage area in front of output elevator assigned to the output station, that an input conveyor for full stacks is provided between input elevator and storage line, and an output conveyor for full stacks is provided between storage line and output elevator, and that separate drives are provided for input elevator, output elevator and storage line.

The carrier plates are no longer fixed to the chain or the gondolas in a non-detachable way but on the contrary, the carrier plates are provided as freely movable parts which, as such, are handled within the store by the respective section of the conveying facility. The carrier plates consist of flat plates, in particular sheet metal with the appropriate dimensions. The elevators used serve to set up the the carrier plates, with the individual products placed on them, into full stacks, or to work through such a full stack. If one considers the full stack to be the smallest unit, then the advantage is achieved that the goods forming the full stack set up first are also the first to be removed again from the store, similar to the case of the gondolas. This full stack will then be transferred by an input conveyor from the area of the input elevator into the area of the storage line. In the area of the storage line, only full stacks are handled, i.e. the movements can be performed relatively slowly. Despite this, the store can be ready to output very quickly. The full stacks are banked up in front of the output station and are pushed further into the conjested area each time the output conveyor transfers a full stack into the output elevator. The separate drives for the elevators, transfer conveyor and storage line are wired suitably in dependence of each other; therefore, the first movement of the input conveyor provided in the area of the input elevator for the input station only occurs when the full stack concerned is completely loaded onto the input elevator.

The new store exhibits a large number of advantages. Its space requirement is considerably less than the space required for a store of the conventional variety. The store has, in principle, a short structural length and is not so tall. There is the possibility of designing the input station with its input elevator and input conveyor on the one hand, as well as the output station with its output elevator and output conveyor on the other, as standard components, and to merely vary the structural length of the storage line with variable receiving capacity in order to achieve different receiving capacities. The advantages with respect to the space requirement are also directly attributable to the handling of the carrier plates. Using this type of store, fewer empty carrier plates are moved around than is the case with the state-of-the-art. If carrier plates are not required, then these can be left out of the operating sequence. Consequently, the mass to be moved is advantageously small. It is surprising that with the new store, a high proportion of carrier plates can carry indvidual items simultaneously. This means a high, variable receiving capacity which lies in the order of magnitude of 95%. With the state-of-the-art, approximately 50% of the store is made available as variable receiving capacity, i.e. half the volume of the store is lost in trying to achieve the variable receiving capacity.

A whole series of advantages result from the omission of the gondolas. The pendulum movement associated with gondolas does not occur. The items of confectionery need no longer be deposited symmetrically on the carrier plates. Differing lengths, as is the case for different individual products at the same input station, can be traced during the push-on process without any problems. As the change of direction around the chain wheels is now omitted, the gondola jump is also avoided.

In comparison, the cleaning of the carrier plates can be very easily realized. This can even be carried out during production, i.e. while the store is in operation, in that the carrier plates are passed through a washing station or, alternatively, passed out of the store stack by stack, cleaned and then passed into the store again. Access to the carrier plates is also possible within the store in that, for instance, a single carrier plate with, for example, a flawed product, can be removed from the store.

The freely movable handling of the carrier plates also brings with it considerable advantages in the area of the input station on the one hand, and the output station on the other. Therefore, it is possible, without any modification, to do away with sliding the individual products onto carrier plates in the area of the input station and instead, feed the individually moveable carrier plates via the knife edge of a belt. In the area of the output station it is possible to retrieve the carrier plates, with their products on them, sideways from the output elevator and, for example, pick off the products from the carrier plates using a suction or grab device so that here again, the items of confectionery are not subjected to sliding friction.

The performance of the store can, in principle, be set at a higher level because a gondola jump is avoided. While up to now a performance of 30 rows/min was possible in the input or output areas, now a performance in the order of magnitude of 50 rows/min can be achieved without any further ado. Of course on the other hand, a slower speed can also be selected in the new store, something that is particularly advisable for delicate items of confectionery. Very much smaller loads are placed on such delicate confectionery than in the store according to the state-of-the-art.

The new store also offers the opportunity to set up a modular system and to benefit from the advantages which result from such a system. It is no longer necessary to design each store individually, on the contrary, the creation of a universal store is possible. The position of the goods on the carrier plates is irrelevant meaning that the carrier plates no longer need to be matched to the goods. Rocking movements are avoided. Transverse accelerations appear to a considerably lower extent because the transporting speed of the stack in the storage line can be set lower than the transporting speed for the individual carrier plates in the input elevator and the output elevator in which the stacks are relatively rapidly formed or discharged in an incremental lifting or lowering of the input or output conveyors. The advantages of the modular system and the universal store, with the resulting standardization, make it possible to manufacture such stores comparatively cheaply and adapt to the desired receiving capacity. In fact a basic store height of approx. 3 m can be adhered to. Such a height clearance is normally available in the factory so that such a store can be installed at any position on a floor.

The mass to be moved is less. The carrier plates are no longer all moved, rather just those which have to be moved. The plate by plate movement on the one hand, and the stack by stack movement on the other, enables a minimum to be reached.

The new store has a lower proportion of bridgeover storage. Practically only one full stack of individual products needs to be formed in order that the store is ready to output shortly afterwards. Only straight-line, jog (pulse) movements occur instead of circular movements as is typical with the change of direction of gondolas. The full stacks can be conveyed comparatively close to each other in the storage line. Free space, such as is necessary to prevent swinging gondolas from colliding with each other, is not necessary here.

The elevators are only designed for the vertical conveyance of carrier plates and the storage line only for the horizontal conveyance of full stacks. The elevators can be designed to operate upwards in jog motion or to be lowered downwards with respect to the input and output stations respectively. If the machine is connected to a production machine on one side and a packaging machine on the other, it is advisable to utilize the operating levels of these machines and align the input and output stations with these levels, whereby the elevators can be provided operating upwards. The space beneath the elevators and the storage line can be utilized for returning empty carrier plate using empty stacks or similar.

A control and monitoring facility is provided for the independent control of the separate drives. Therefore, the input elevator allocated to the input station has a drive which is always set to jog function when individual products to be accepted in the store, appear at the input station. The drive for the input conveyor is then activated only when the prescribed full stack has been formed to the prescribed height, i.e. number of carrier plates, in the input elevator. The drive for the storage line can be set up to operate continuously or, alternatively, only be triggered when beforehand, the input conveyor has transferred a full stack from the input elevator to the storage line, or there are still gaps between the full stacks on the storage line. The same applies to the drives for the other components of the store.

Slideways can be provided in the area of the storage line for guiding full stacks of carrier plates; the carrier plates can be individually supported and jointly moved in stacks on said slideways. Such slideways are a very simple form of construction for holding the carrier plates reliably by means of static friction and allowing the necessary transportation of stacks. If a relatively large variable receiving capacity is desired, then these slideways need merely to be designed relatively long, and the associated drive for the full stack in the storage line is correspondingly lengthened. The equipment provided on the input and output sides is not altered by this.

The number of carrier plates in the full stack can be adjusted. Therefore, it is advantageous, for example, to assign a smaller number of carrier plates to a full stack when starting to fill the store so that the store is very quickly ready to output. If the store is already in a position to output, then it is advantageous to so define the number of carrier plates in a full stack that the prescribed design height is exploited.

A conveying and storage path for replenishing, maintaining or dismantling empty stacks (22) of carrier plates without individual products is provided between the output station and the input station, i.e. in the return stretch so to speak. Here, the carrier plates, for example, are then brought to a halt in stacks if a comparatively low variable receiving capacity is adequate. The number of carrier plates available in the area of the input station only needs to correspond to the number of individual products which occur and need to be stored.

In detail, the conveying and storage path can be followed by a horizontal conveyor and a return conveyor, whereby a lifter for building an empty stack of carrier plates without individual products is provided in the transition area of said conveyors, and whereby a reversible conveying facility is provided for the empty stack. It is thereby possible, by reversing the direction of movement, to store (park) the empty stack or to dismantle it again according to the accumulation of required empty carrier plates in the area of the input station and the number of empty carrier plates occuring in the area of the output station.

The input conveyor and the output conveyor are assigned to the input elevator and output elevator respectively, and constructed as a push-in and push-out device respectively, whereby said devices grip the carrier plates in the full stack from behind. Simple design possibilities result here.

The conveying facility in the area of the storage line can have carrier arms which grip the carrier plates in the full stack from behind, whereby said carrier arms can be pivoted around vertical axes in the carrying position or empty position and can be continually driven step-wise. Other design possibilities are also conceivable. Therefore, sliders can also be used in order to grab each carrier plate in the full stack from behind and convey it further stepwise, whereby congestion occurs by the output elevator assigned to the output station.

The conveying facility can have a control unit for the carrier arms which, depending on the first free space opposite the conveying facility, are subsequently all transferred into the carrying position.

BRIEF DESCRIPTION OF THE DRAWINGS

The invention will be further described by means of a preferred embodiment example.

FIG. 8 shows

DETAILED DESCRIPTION

Figure 1:
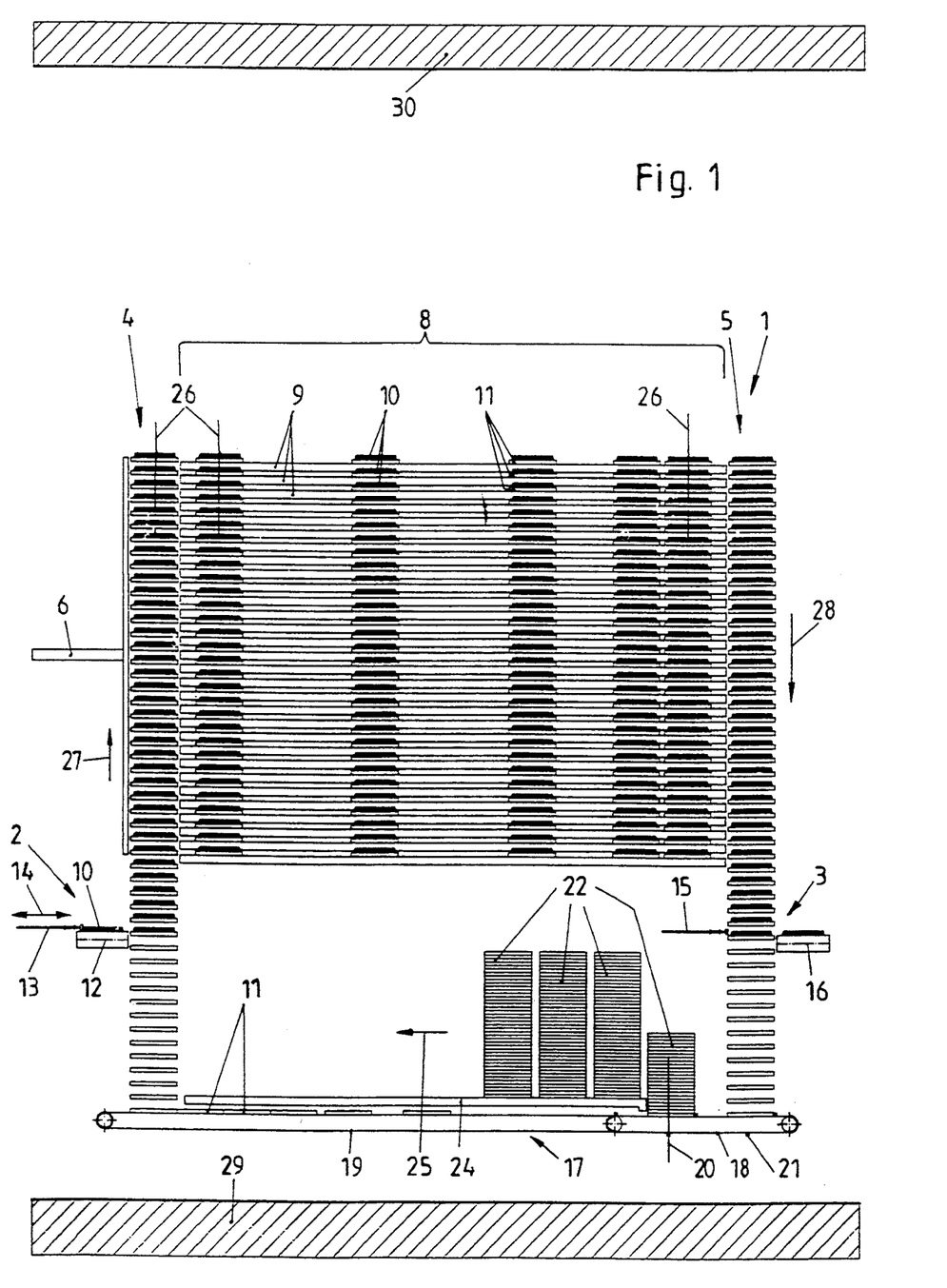
FIG. 1 shows a vertical section through the store during operation.
Figure 6:
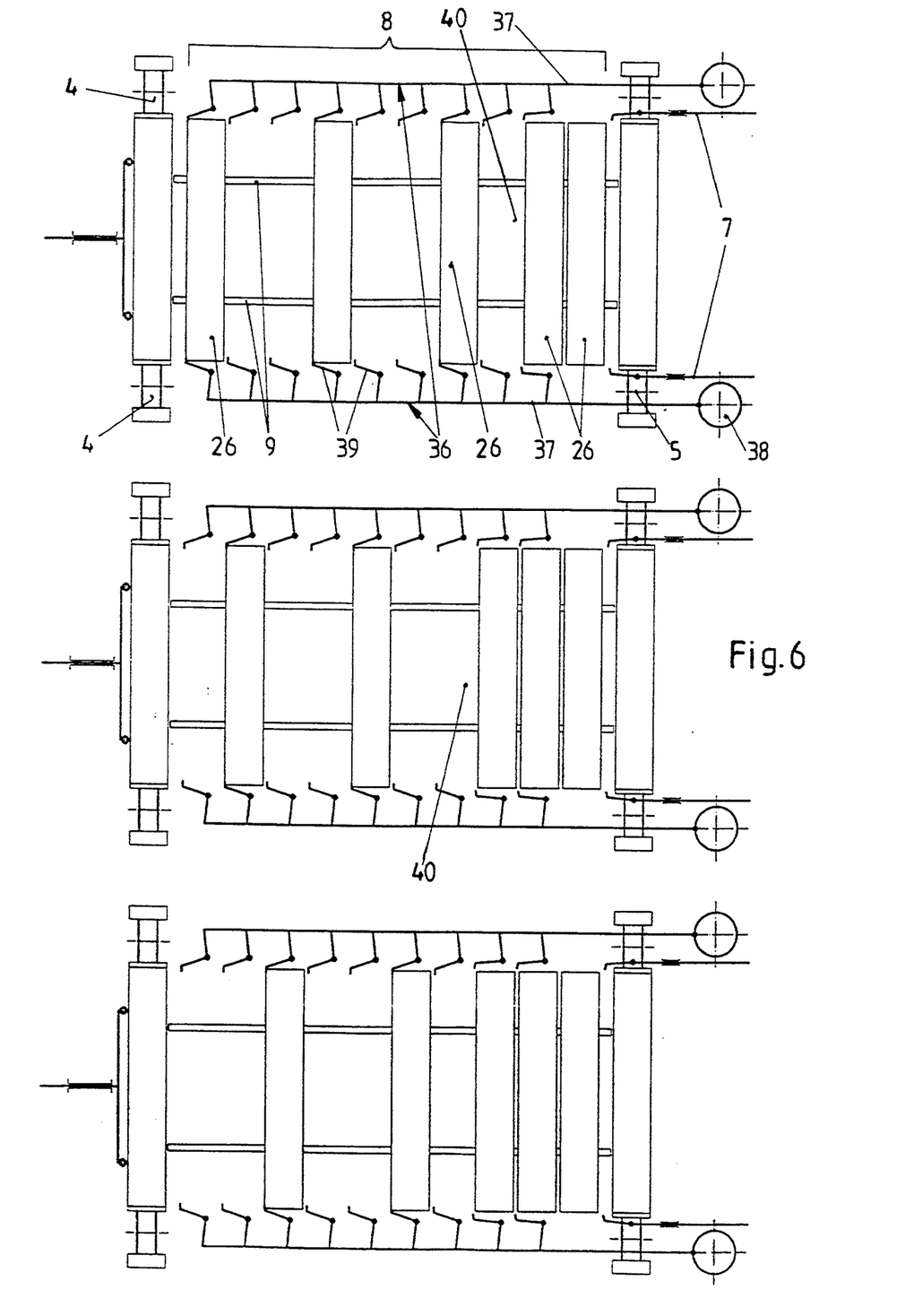
FIG. 6 shows a series of plan views of the store.

The parts essential to the invention are illustrated schematically in the vertical longitudinal section through the store 1 according to FIG. 1. There is an input station 2 and an output station 3. An input elevator 4 is indicated in the area of the input station 2 and an output elevator 5 in the area of the output station 3. The principal design features of elevators 4 and 5 are identical, whereby the input elevator 4 operates upwards, continuously, in jog mode, while the output elevator 5 operates downwards, progressively, in jog mode. An input conveyor 6 is assigned to the input elevator 4 and an output conveyor 7 to the output elevator 5 (FIG. 6). A storage line 8 with variable receiving capacity is located between the two elevators 4 and 5. Horizontal slideways 9 are arranged in the area of the storage line 8. The store serves for the reception of individual products 10 which lie on freely moveable carrier plates 11.

A conveyor belt 12 is provided in the area of the input station 2, whereby said belt is arranged parallel to the face of the store 1 on the input side. The individual products 10 are conveyed along said belt in pulse (jog) mode from the production machine to the store input. An input slider 13 is assigned to the conveyor belt 12, whereby said slider is driven backwards and forwards, as indicated by arrow 14, in order to push the individual products, mostly in rows, onto the associated empty carrier plates 11 of the input elevator 4. It can be seen that the individual products 10 can also be transferred at right-angles to this, i.e. via a conveyor which is arranged in the direction of arrow 14. Indeed, in this case a belt knife edge can be used in order to guide out the empty carrier plates 11 with a loop-type movement from the lower section of the store and to feed them directly with individual products via the belt knife edge while avoiding the input slider 13 and the sliding friction associated with this.

An output slider 15 is provided in the area of the output station 3, whereby said slider pushes the individual products 10 from the carrier plates onto a conveyor 16, from where they are fed to the packaging machine or packaging plant.

Figure 5:
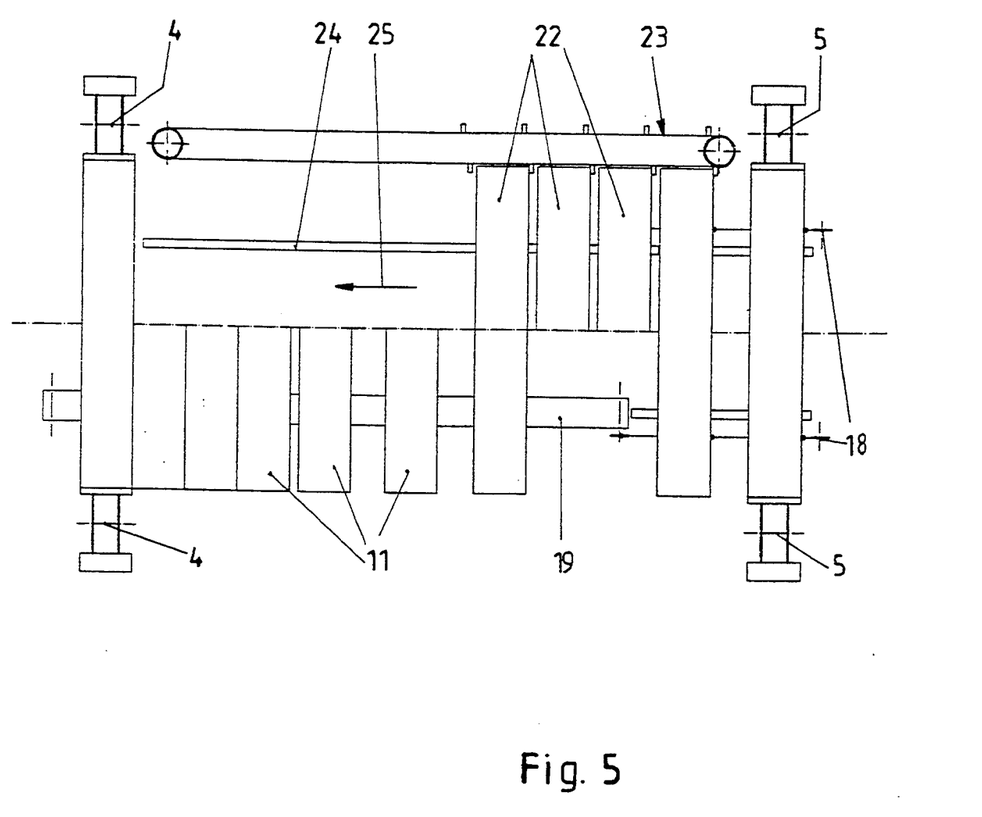
FIG. 5 shows a plan view of the lower part of the store in the return stretch.

Illustrated in the lower region of the store 1 is the return stretch which serves for conveying and handling the empty carrier plates 11. Here, a conveying and storage path 17 is provided for the empty carrier plates 11. The essential parts, a horizontal conveyor 18 and a return conveyor 19, are connected in line with each other. A lifter 20 is merely indicated in the area of the horizontal conveyor 18, whereby by means of said lifter the empty carrier plates 11, laid in the carrier lugs 21 of the horizontal conveyor 18, are raised upwards from the belt of the horizontal conveyor 18 to be formed into stacks. The empty stack 22 of empty carrier plates 11 formed in this way, can be placed on slide rails 24 in stacks by means of a conveying facility 23 (FIG. 5). If the store is emptied, the empty stacks 22 build up and are pushed along the slide rails 24 by the conveying facility 23 in the direction of arrow 25. If more individual products 10 are accepted by the store than are discharged, then the empty stacks 22 are moved by the conveying facility 23 in the opposite direction to arrow 25 and are jogged back through the circuit. Lifter 20 not only serves for shifting empty carrier plates 11 into and out of the circuit, on the contrary, it is so designed that it can remain in the raised position. If the input and output cycles of the store coincide, i.e. jog for jog, the same number of individual products 10 are accepted in the store as are removed from it, the carrier plates 11 leaving output station 3 accumulate at exactly the same rate as they are needed again at input station 2. In this case, the lifter 20 remains in the raised position and the carrier plates are conveyed right through on the horizontal conveyor 18, passing below the raised stack 22, thereby reaching the return conveyor 19 and from there moving onto the input elevator 4.

The store 1 is operated as follows. Empty carrier plates 11 travel along the return conveyor 19 in the area of the input elevator 4 and are lifted from this in jog mode until an empty carrier plate 11 reaches the level of the conveyor belt 12 in the area of the input station 2. If now individual products 10 are to be or need to be accepted in the store 1, the input slider 13 is actuated according to arrow 14 and a row of individual products 10 is pushed onto a carrier plate 11. As soon as this has happened, the drive for the input elevator 4 is activated. This switches one stroke further so that the carrier plate 11 occupied by individual products is lifted by one division, i.e. the distance between two neighbouring carrier plates 11 in the input elevator 4. At the same time, an empty carrier plate 11 reaches the level of the input station 2 so that the push-in process is repeated as long as individual products 10 are to be further accepted in the store. In this manner, a full stack 26 of carrier plates 11 occupied by individual products 10 is formed in the input elevator 4. In the case under consideration, a completely full stack 26 consists of 30 carrier plates 11, one on top of the other, all filled with individual products 10. As soon as the first carrier plate 11, loaded with individual products 10, reaches the highest point of the input elevator 4, i.e. a first, completely full stack 26 has been formed, the drive for the input conveyor 6 is activated. The transfer conveyor 6 extends the full height of the full stack 26 and pushes such a full stack 26 out of the input elevator 4 into the area of the storage line 8, in fact onto a first receiving position directly at the start of this storage line 8. As soon as this has happened, the input elevator 4 can again build a new full stack 26 in that the carrier plates 11 occupied by individual products 10, are jogged upwards in the input elevator 4 according to arrow 27° The height of the full stack 26 can be adjusted. In order to reach a point where the store is ready to output individual products 10 very soon after the beginning of the filling procedure, a low stack height should be set. Therefore, it can be advisable at first to build full stack 26 from, for example, just ten filled carrier plates 11, one above the other, at the start of the filling procedure, and to subsequently increase the height of the stack if the variable receiving capacity is to be raised.

Figure 7:
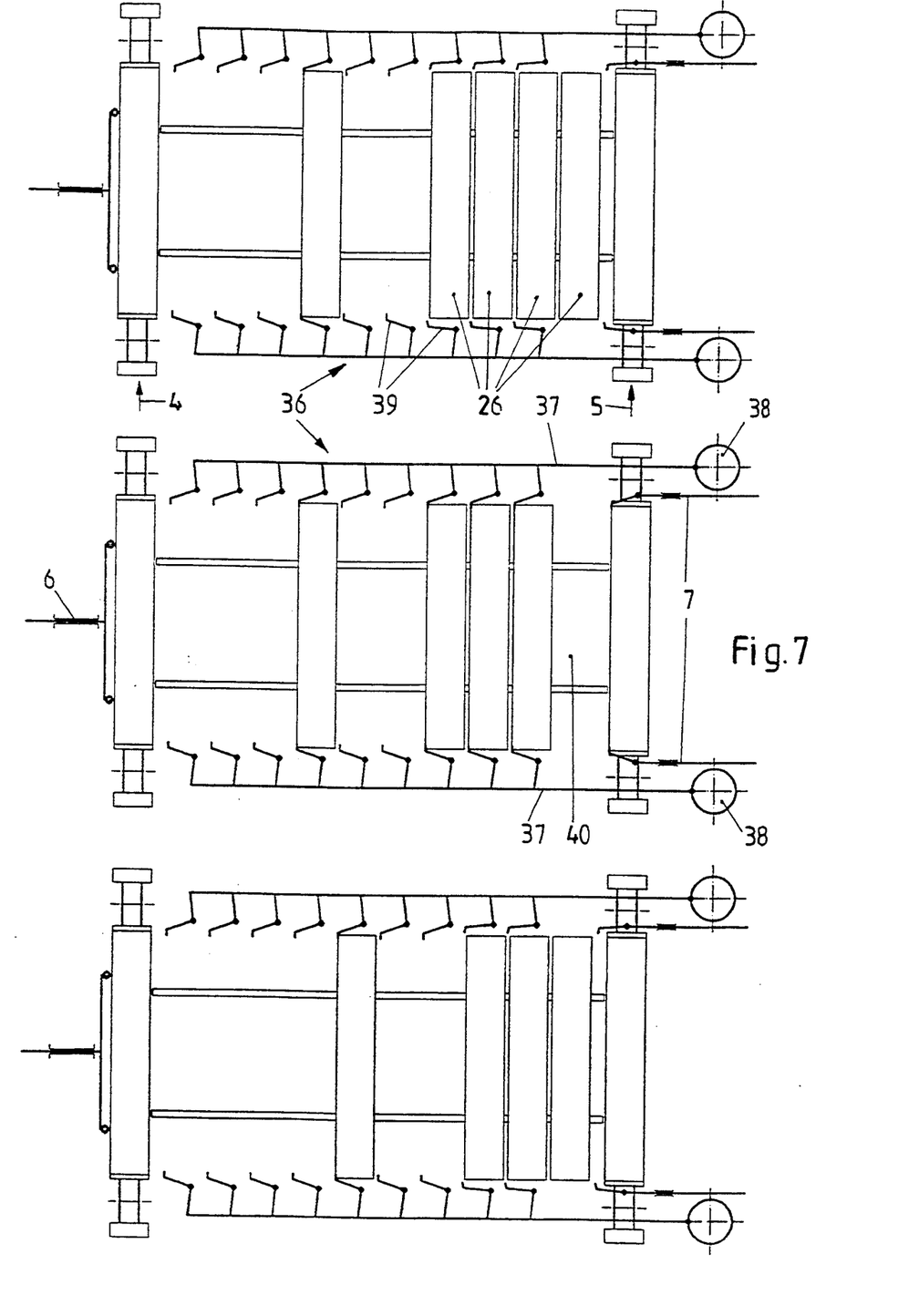
FIG. 7 shows the continuation of FIG. 6.

The individual full stacks 26 are now moved, stack by stack and step by step, onto the conveying (storage) line 8 in the longitudinal direction of the store 1, as illustrated in FIGS. 6 and 7. This movement is so executed that the full stacks 26 become congested in front of the output elevator 5 if the output elevator 5 is still either partly or wholly occupied by carrier plates. However, if the output elevator 5 is empty, then the first full stack 26 in front of the congestion (waiting) point is transferred immediately into the output elevator 5, and the following full stack 26 waits at the congestion point. In the output elevator 5 the carrier plates 11 occupied by individual products 10 migrate downwards in jog mode, i.e. step by step, in the direction of arrow 28 until the first carrier plate reaches the area of the output station 3 and the individual product located on said plate is pushed off using the output slider 15 onto the conveyor 16. This of course only takes place when the individual products 10 are to be output from the store. The empty carrier plates 11 migrate on the output elevator 5 further downwards and are deposited individually in jog mode onto the horizontal conveyor 18 and are taken away on the carrier lugs 21 of said conveyor. If individual products 10 are to be removed from the store 1, without other individual products being fed into the store at the same time, then lifter 20 stacks the accumulating empty carrier plates 11 into empty stacks 22 which are shifted along the slide rails 24. If on the other hand individual products 10 are fed into the store without individual products being output from the store at the same time, then lifter 20 works in the reverse direction and lays in turn the lowest carrier plate 11 from an empty stack 22 onto the return conveyor 18, from where they travel to the area of the horizontal conveyor 19 so that the circuit is then completed.

The structural size of store 1 is very small. To make this clear, a factory shed with a headroom of approx. 5 m is indicated by a floor 29 and a ceiling 30, allowing one to recognize that the store 1 can have a height of approx. 3 m so that it can also be used in buildings with low headroom. The store 1 can be manufactured in series. It no longer needs to be matched to each individual product. It exhibits a very high proportion of variable storage capacity in the smallest space. The carrier plates 11 are only moved purely horizontally and purely vertically, and in fact with comparatively low speeds so that the individual products 10 cannot slip off the carrier plates 11. The fastest speed is the jogging speed of the input elevator 4 and the output elevator 5. In any case, no transverse forces act on the individual products 10. A very much slower speed can be used in the area of the storage line 8 because only totally full stacks 26 are moved here.

Figure 2:
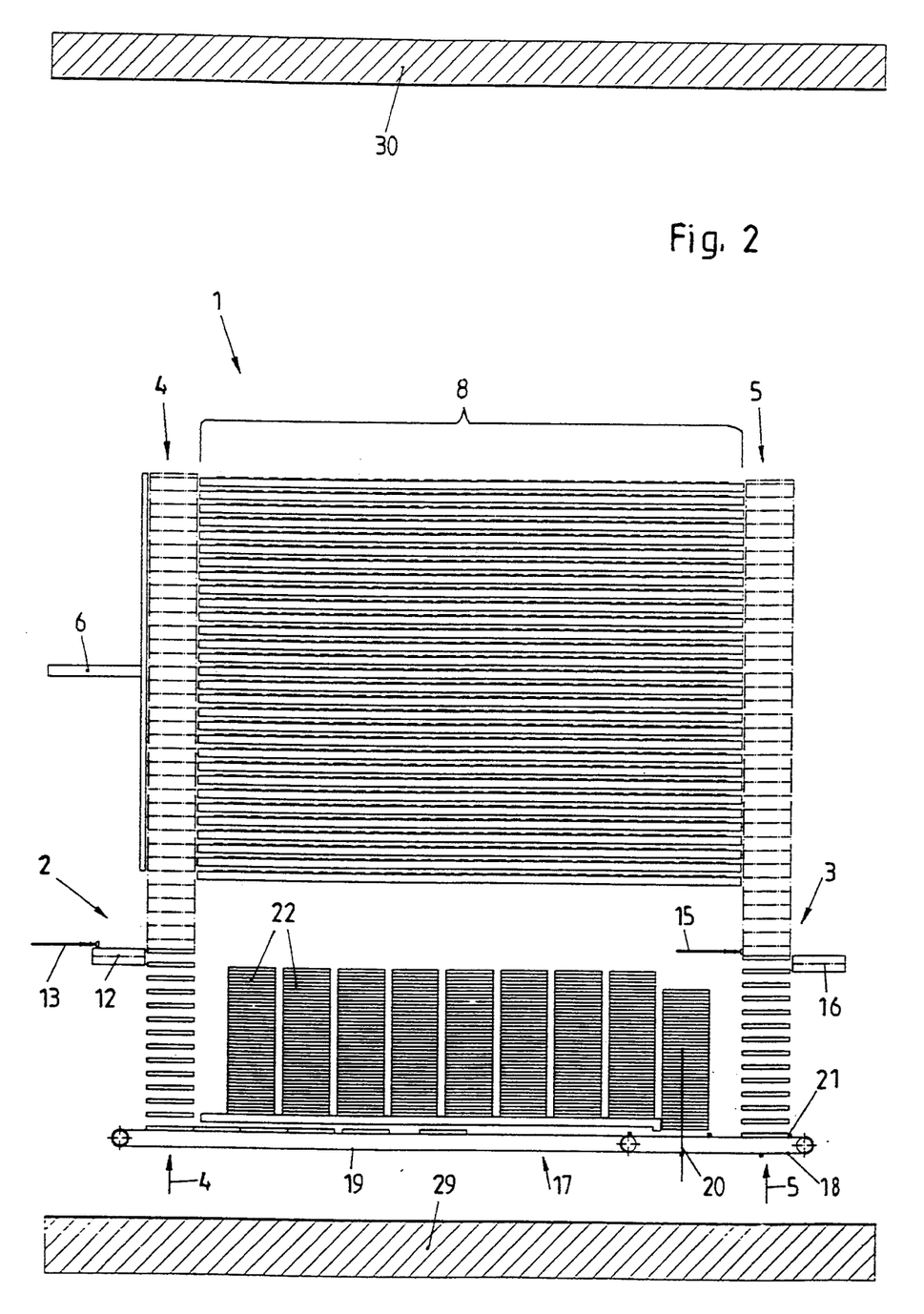
FIG. 2 shows a vertical section through the completely empty store.

FIG. 2 shows a completely empty store 1. There are neither carrier plates 11 nor individual products 10 in the upper section. The carrier plates 11 are parked in empty stacks 22 in the lower section. It can be seen that such empty stacks 22 can be very easily removed, cleaned and reinserted. This is also possible during operation. Empty carrier plates 11 are in position below input station 2 so that the store is ready to receive.

Figure 3:
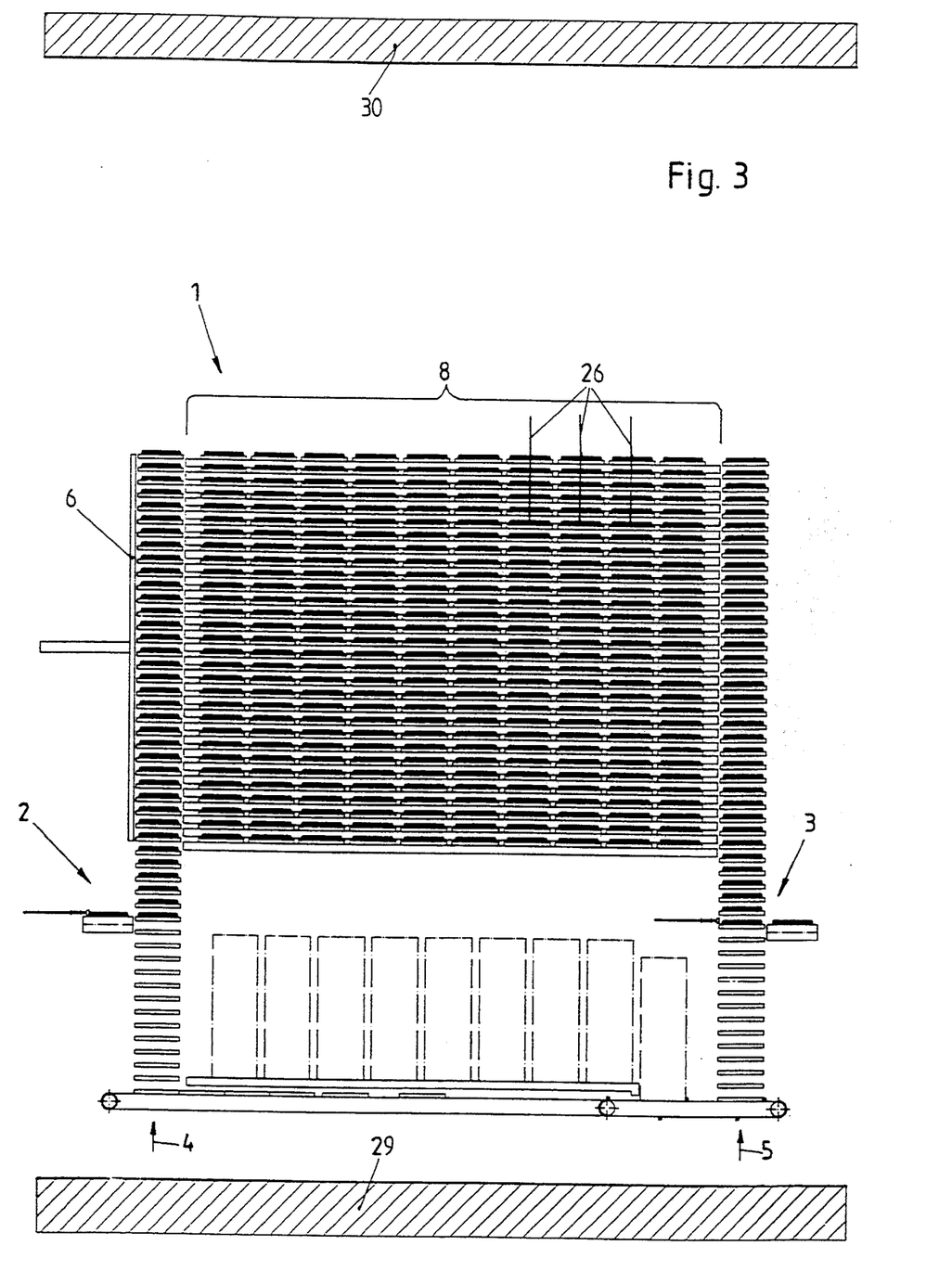
FIG. 3 shows a vertical section through the store when filled to maximum.

FIG. 3 shows a store 1 filled to maximum. The parking spaces for empty stacks 22 in the lower stretch are indicated by chain-dot lines. The entire storage line 8 is filled up with full stacks 26° In addition, the input elevator 4 and the output elevator 5 are completely occupied. Such a store can only accept further individual products 10 if at least those individual products 10 from 30 carrier plates 11 are first removed from the output elevator 5 with the aid of the output station 3. Then the full stacks 26 can advance so that the input elevator 4 is again ready to receive.

Figure 4:
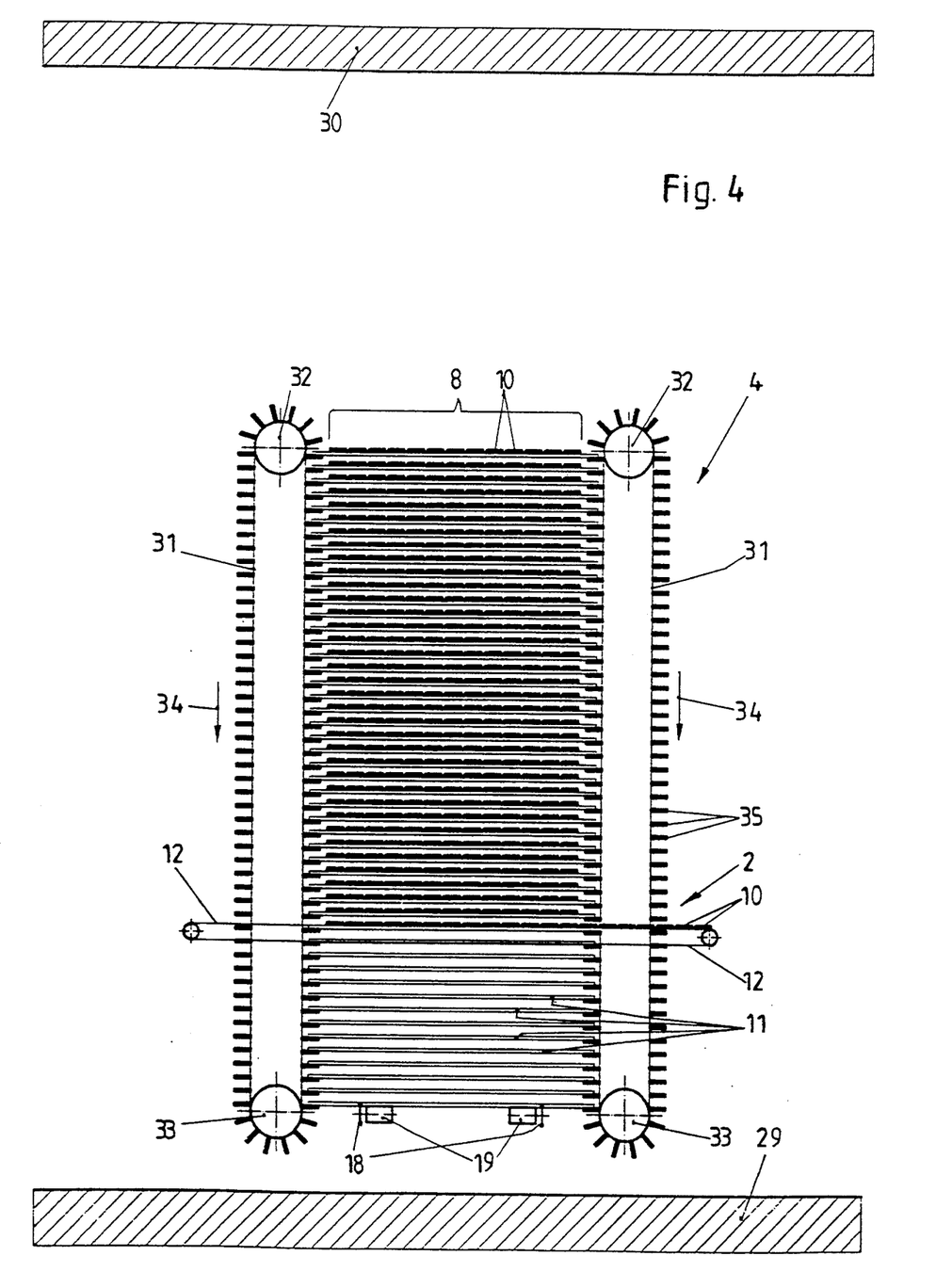
FIG. 4 shows a view of the input side of the store.

FIG. 4 shows a view of the front face of the stored and is in fact a view of the input elevator 4. Essential components of the input elevator 4 are two endless belts 31, left and right, which are driven via reversing wheels 32, 33 in the direction of arrows 34 and have carrier lugs 35 which engage, step- or jog-wise, with the individual carrier plates 11, thereby allowing them to be picked up. This means that the empty carrier plates 11 are taken from the return conveyor 19 and migrate upwards in jog mode to the area of the conveying line 8. In the area of the input station 2, the conveyor belt 12 extends over the entire front face of the store so that the individual products 10 can be pushed, row by row, onto the carrier plates 11. In the embodiment example shown here, 30 bars of chocolate are pushed onto one carrier plate in one movement. Instead of allowing the input elevator 4 to work upwards and the output elevator 5 downwards, a reversal of this is of course also possible. The storage line 8 is then located at the bottom of the store 1, while the empty stretch is at the top.

FIG. 5 illustrates the relationships in the lower stretch. Two half-sections are shown here which create a plan view of various horizontal planes. The upper half-section shows half the empty stack 22 which is pushed along the slide rails 24. Also to be seen is the conveying facility 23 which is of course mirrored on the other side (not illustrated) so that the empty stack 22 can be pushed further in the direction of arrow 25. The lower half-section is essentially a plan view of the return conveyor 19. Here it can be seen how the empty carrier plates 11 collect in front of the input elevator 4 so that the foremost carrier plate in the area of the input elevator 4 can be taken up when the input elevator 4 performs one jog movement. It is clear that the return conveyor 19 is then shut down when a number, which may be adjusted, of carrier plates 11, for example, four pieces, have collected together, one after the other.

FIGS. 6 and 7 show schematic plan views of the store and especially serve to illustrate the method of functioning in the area of the storage line 8. The first view in FIG. 6 shows the relationships as are also illustrated in FIG. 1. Both input elevator 4 and output elevator 5 contain complete, full stacks 26. Two further full stacks 26 have collected next to and in front of the output elevator 5. Three more full stacks 26 are located spaced out at the start and in the middle of the storage line 8. A conveying facility 36, which engages with the left- and right-hand sides of the carrier plates 11 in the full stacks 26, is indicated in a very schematic form. A driving linkage 37 is driven backwards and forwards continuously by means of a cam 38. Each driving linkage 37 has carrier arms 39 which are arranged so that they may pivot around vertical axes; each of said arms can be pivoted from a home (off) position to a carrying position by means of an individual additional drive, for example, a pneumatic cylinder, which is not illustrated. A full stack 26 is not engaged when said arms are in the home position, but rather in the carrying position. The carrier arms 39 are now always so controlled that the carrier arm 39 allocated to a free space and all the following carrier arms, right back to the input elevator 4, are pivoted into the carrying position; one jog of the conveying facility 36 is then executed. The uppermost view in FIG. 6 shows two full stacks 26, one after the other, which have collected in front of the congestion point. The free space 40 will then have been formed. A full stack 26 then again moves in the same direction onto the input elevator 4 as well as further free spaces, and so on. One can see that the conveying facility 36 has been drawn in the position in which its elements next come to the input elevator 4. All carrier arms 39, with the exception of the first pair, have been pivoted into the carrying position, i.e. in particular the carrier arms 39 which are allocated to the free space 40 in this position. If then the conveying facility 36 executes one jog, the middle position in FIG. 6 is reached so that now three full stacks 26 have collected in front of the output elevator 5 and the free space 40 has shifted by one place. As a result of this, two pairs of carrier arms 39 are now located in the home position. During these movements the output conveyor 7 is not driven because the output elevator 5 (FIG. 1) is still occupied by carrier plates 11 and individual products 10. The conveying facility 36 then moves on another jog so that the position in the bottom diagram of FIG. 6 is reached. In doing this it is assumed that a full stack 26 has still not completely built up in the input elevator 4 so that the input conveyor 6 will still not have been activated either.

The relationships after one more jog of the conveying facility 36 are shown in the first view of FIG. 7. Four full stacks 26 have now collected. It is now assumed that, in the meantime, owing to removal of individual products 10 from output elevator 5, a height corresponding to a full stack 26 has also been emptied. It is important to watch here that gaps never appear within the store in the vertical direction in the area of the input elevator 4 and output elevator 5. The six carrier plates in the output elevator and beneath the storage line 8 are still filled with individual products. However, this means that the output elevator 5 is ready to receive another full stack 26. The output conveyor 7 is now activated, as shown in the middle view in FIG. 7. The first full stack from the group of four full stacks waiting here is shifted forward into the output elevator 5. The first free space 40 thus ensues in the direction of the input elevator 4 and directly in front of the collecting point so that now all carrier arms 39 are switched into the carrying position and so that upon the next jog of conveying facility 36, the three full stacks 26 located adjacent each other and the full stack 26 which is a short distance away are moved forward together by one jog along the storage line 8. Just to keep things simple, it is assumed that in doing this, no further individual products are introduced into the store at the same time, i.e. the full stack 26 in input elevator 4 is not yet complete.

Figure 8A:
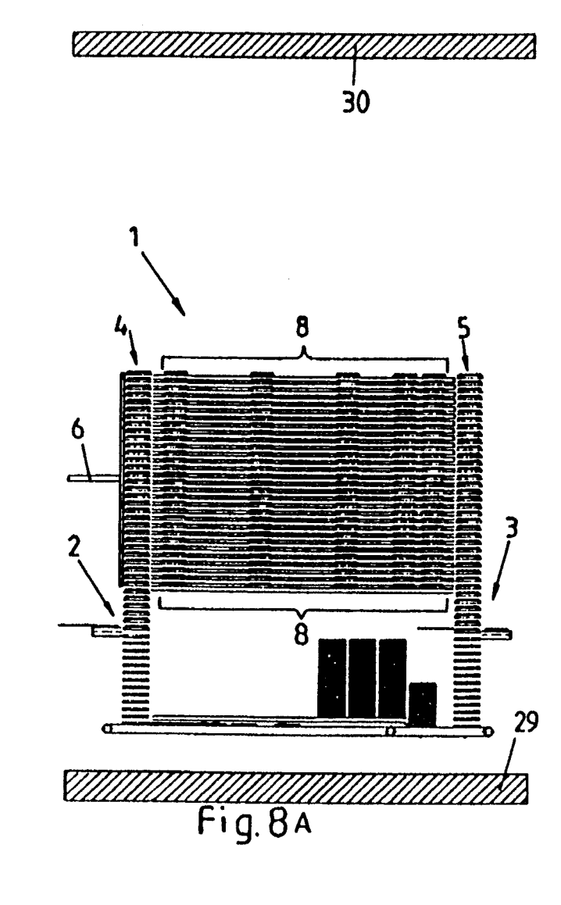
FIGS. 8a and 8b show a size comparison between the new store (FIG. 8a) and the store according to the state-of-the-art (FIG. 8b).
Figure 8B:
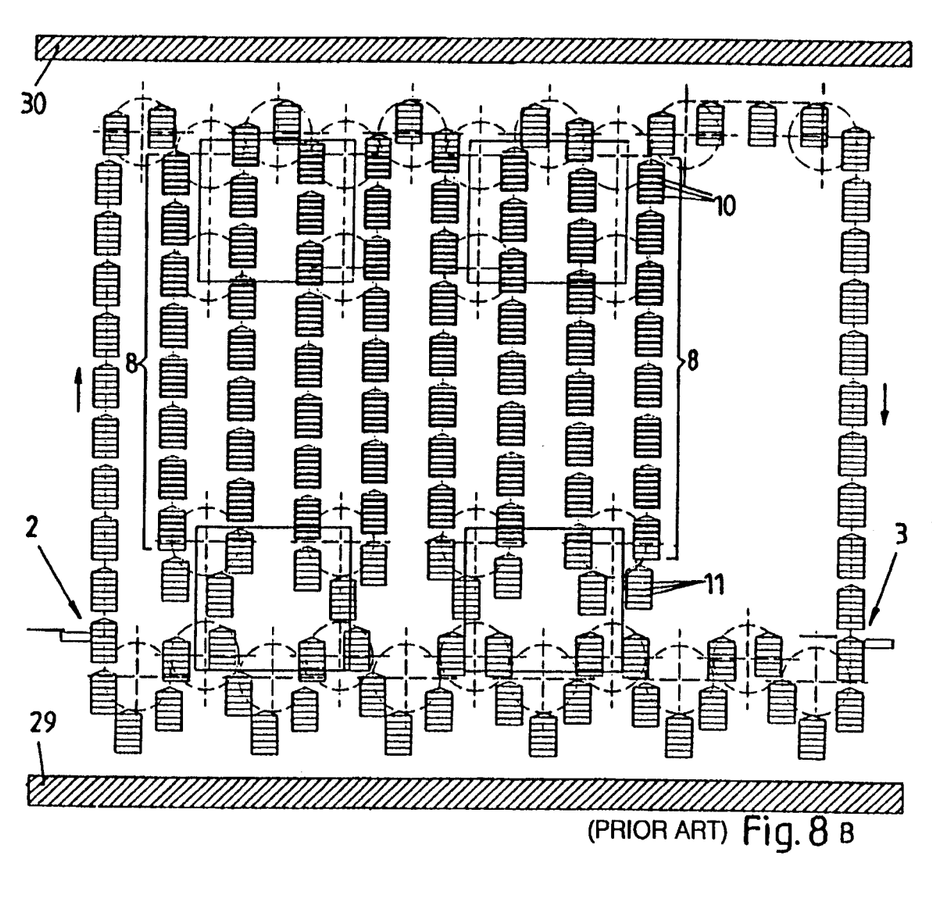

FIG. 8 shows a size comparison between the new store (left) and the store according to the state-of-the-art (right). Two stores are illustrated, both of which possess roughly equal variable receiving capacities. In the case of the store according to the state-of-the-art, with its gondolas and the carrier plates located on these, individual products are only shown in that part of the storage line which corresponds to the storage line with variable receiving capacity. One can see from this size comparison that the store according to the state-of-the-art is built considerably longer and also considerably higher in order to make available the same amount of variable receiving capacity. The change of direction of the gondolas means that the gondola jump is necessary and the carrier plates on the gondolas can only ever build relatively small stacks. In the case under consideration, each gondola has six carrier plates with individual products.

This size comparison enables us to see that for the subject of the application, there is the possibility of creating a universal store, i.e. independent from the type and shape of the individual products. In addition, existing components on the input and output sides can be standardized. For stores with differing sizes of variable receiving capacity, it is then only necessary to design the storage line 8 shorter or longer, while the input station with its input elevator 4 and input elevator 6 on the one hand, and the output station with its output elevator 5 and output elevator 7 on the other, can be taken over unaltered. It is certainly possible, with a factory headroom of 5 m, to design the new store to be even taller and hence increase the capacity. However, this is generally not necessary because the variable receiving capacity of a store with the standard height of 3 m is sufficient for the majority of applications.

While a preferred embodiment of the invention has been shown and described, it will be apparent to those skilled in the art that variations and modifications can be made thereof without departing from the spirit and scope of the invention as set forth in the following claims.

LEGEND FOR DRAWINGS

1=Store
2=Input station
3=Output station
4=Input elevator
5=Output elevator
6=Input conveyor
7=Output conveyor
8=Storage line
9=Slideway
10=Individual products
11=Carrier plate
12=Conveyor belt
13=Input slider
14=Arrow
15=Output slider
16=Conveyor
17=Conveying and storage path
18=Horizontal conveyor
19=Return conveyor
20=Lifter
21=Carrier lug
22=Empty stack
23=Conveying facility
24=Slide rail
25=Arrow
26=Full stack
27=Arrow
28=Arrow
29=Floor
30=Ceiling
31=Endless belt
32=Reversing wheel
33=Reversing wheel
34=Arrow 35=Carrier lug
36=Conveying facility
37=Driving linkage
38=Cam
39=Carrier arm
40=Free space

What is claimed is:

1. Storage apparatus for storing individual products and having an input station and an output station and storage means extending therebetween, comprising:

carrier plates for receiving and supporting individual products thereon;

means for placing a product on each carrier plate at said input station;

first elevator means, adjacent said input station, for forming a stack of said carrier plates;

a plurality of spaced slideways forming said storage means and for receiving said stack of carrier plates;

first transfer means for transferring said stack of carrier plates as a stack from said first elevator means to said plurality of spaced slideways;

stack moving means for moving said stack of carrier plates as a stack towards said output station;

second elevator means independently operable with respect to said first elevator means, adjacent said output station, for receiving said stack of carrier plates from said slideway;

second transfer means independently operable with respect to said first transfer means for removing said stack of carrier plates as a stack from said slideways and placing them on said second elevator means;

means for removing a product from each carrier plate on said second elevator means at said output station; and a second stack of said carrier plates, wherein said stack moving means moves said stack of carrier plates independently of said second stack of carrier plates.

2. The storage apparatus of claim 1, and further including independent drives for said first elevator means, said stack moving means, and said second elevator means so that said first elevator means, said stack moving means, and said second elevator means are operated independently with respect to one another.

3. The storage apparatus of claim 1, wherein said stack of carrier plates ranges from 1 to 30 carrier plates.

4. The storage apparatus of claim 1, wherein said stack moving means comprises means for conveying up to 30 carrier plates simultaneously.

5. The storage apparatus of claim 1, wherein the size of said stack of said carrier plates is variable.

6. The storage apparatus of claim 1, further comprising a means for storing empty carrier plates outside of said storage means.

7. The storage apparatus of claim 1, wherein said first transfer means engages and pushes said stack of carrier plates as a stack from said first elevator means to said plurality of spaced slideways.

8. The storage apparatus of claim 1, wherein said second transfer means engages and pushes said stack of carrier plates as a stack from said plurality of spaced slideways to said second elevator means.

* * * * *